(12) United States Patent
Zhong et al.

(10) Patent No.: US 11,927,568 B2
(45) Date of Patent: Mar. 12, 2024

(54) DOUBLE INDUCTANCE COILS FOR POWERING WIRELESS ULTRASOUND TRANSDUCERS

(71) Applicant: THE UNIVERSITY OF BRISTOL, Bristol (GB)

(72) Inventors: Cheng Huan Zhong, Bristol (GB); Anthony Croxford, Bristol (GB); Paul Wilcox, Bristol (GB)

(73) Assignee: THE UNIVERSITY OF BRISTOL, Bristol (GB)

( * ) Notice: Subject to any disclaimer, the term of this patent is extended or adjusted under 35 U.S.C. 154(b) by 0 days.

(21) Appl. No.: 17/383,312

(22) Filed: Jul. 22, 2021

(65) Prior Publication Data

US 2022/0011273 A1 Jan. 13, 2022

Related U.S. Application Data

(63) Continuation of application No. 15/847,833, filed on Dec. 19, 2017, now abandoned, which is a continuation of application No. PCT/GB2016/051668, filed on Jun. 7, 2016.

(51) Int. Cl.
*G01N 29/24* (2006.01)
*H02J 50/12* (2016.01)

(52) U.S. Cl.
CPC ..... *G01N 29/2475* (2013.01); *G01N 29/2481* (2013.01); *G01N 2291/044* (2013.01); *H02J 50/12* (2016.02)

(58) Field of Classification Search
CPC .......... G01N 29/2475; G01N 29/2481; G01N 2291/044; H02J 50/12

USPC .......................................................... 73/629
See application file for complete search history.

(56) References Cited

U.S. PATENT DOCUMENTS

| | | | |
|---|---|---|---|
| 8,836,503 B2 | 9/2014 | Gelcin et al. | |
| 9,843,217 B2 * | 12/2017 | Atasoy | H02J 50/10 |
| 10,658,847 B2 | 5/2020 | Peralta et al. | |
| 2002/0154029 A1 | 10/2002 | Watters et al. | |
| 2004/0046483 A1 | 3/2004 | Dupont et al. | |

(Continued)

FOREIGN PATENT DOCUMENTS

| | | |
|---|---|---|
| CN | 102738906 A | 10/2012 |
| CN | 202662446 U | 1/2013 |

(Continued)

OTHER PUBLICATIONS

Translation CN-203871932 (Year: 2014).*

(Continued)

*Primary Examiner* — Mischita L Henson
*Assistant Examiner* — Monica S Young
(74) *Attorney, Agent, or Firm* — One LLP

(57) ABSTRACT

A wireless ultrasound sensor 404 for non-destructive testing of a test object 502, the sensor comprising: an ultrasound transducer 406; a first induction coil 408, electrically coupled to the ultrasound transducer; a second induction coil 414, electrically coupled in parallel with the first induction coil; wherein the first and second induction coils are arranged to enable the transducer to be inductively operated by a remote device 504; and wherein the diameter of the second induction coil is greater than the diameter of the first induction coil.

9 Claims, 4 Drawing Sheets

(56) References Cited

U.S. PATENT DOCUMENTS

| | | | |
|---|---|---|---|
| 2006/0235020 A1* | 10/2006 | Kim | A61P 19/10 |
| | | | 544/183 |
| 2007/0074579 A1* | 4/2007 | Cook | G01L 9/0072 |
| | | | 73/718 |
| 2009/0165546 A1 | 7/2009 | Cook et al. | |
| 2009/0230777 A1 | 9/2009 | Baarman et al. | |
| 2009/0299216 A1 | 12/2009 | Chen et al. | |
| 2011/0308320 A1* | 12/2011 | Rocznik | G01L 19/141 |
| | | | 73/702 |
| 2012/0007579 A1 | 1/2012 | Apblett et al. | |
| 2013/0043887 A1 | 2/2013 | Ziolkowski et al. | |
| 2013/0093258 A1* | 4/2013 | Lee | H02J 50/12 |
| | | | 307/104 |
| 2014/0028252 A1 | 1/2014 | Vuori et al. | |
| 2014/0028330 A1* | 1/2014 | Potyrailo | G01N 33/0073 |
| | | | 324/633 |
| 2015/0045227 A1* | 2/2015 | Ahn | B60L 58/12 |
| | | | 307/104 |
| 2015/0371771 A1 | 12/2015 | Qahouq | |
| 2016/0126002 A1 | 5/2016 | Chien et al. | |
| 2016/0172869 A1* | 6/2016 | Park | H02J 50/12 |
| | | | 307/104 |
| 2016/0197511 A1 | 7/2016 | Atasoy et al. | |
| 2017/0054213 A1 | 2/2017 | Singh et al. | |
| 2018/0174746 A1 | 6/2018 | Ryu et al. | |
| 2018/0205268 A1* | 7/2018 | Park | H02J 50/80 |
| 2020/0203831 A1 | 6/2020 | Ichikawa | |

FOREIGN PATENT DOCUMENTS

| | | | | |
|---|---|---|---|---|
| CN | 203839170 U | | 9/2014 | |
| CN | 203871932 U | * | 10/2014 | |
| CN | 203871932 U | | 10/2014 | |
| DE | 102007014696 B3 | | 10/2008 | |
| DE | 102012105647 A1 | * | 1/2014 | B06B 1/0207 |
| DE | 102012105647 A1 | | 1/2014 | |
| GB | 2523266 A | | 8/2015 | |
| JP | 2012205379 A | | 10/2012 | |
| KR | 101485345 B1 | | 1/2015 | |
| WO | WO 2016/009174 A1 | | 1/2016 | |

OTHER PUBLICATIONS

Translation DE-102012105647 (Year: 2014).*
WO, PCT/GB2016/051668 ISR and Written Opinion, dated Sep. 13, 2016.
Zhong, et al., "Investigation of Inductively Coupled Ultrasonic Transducer System for NDE", IEEE Transactions On Ultrasonics, Ferroelectrics, and Frequency Control, 2013, vol. 60, No. 6, pp. 1115-1125.
MY, PI 2017001738—Substantive Examination Adverse Report, dated Sep. 13, 2016.

* cited by examiner

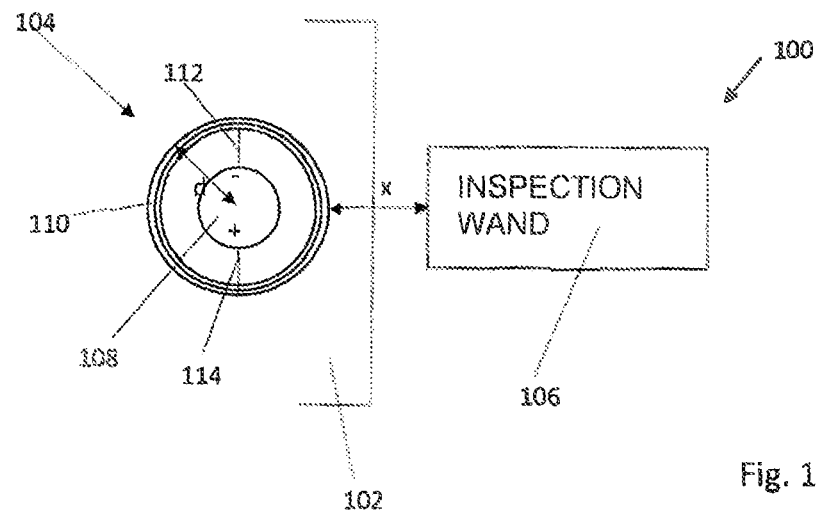
Fig. 1
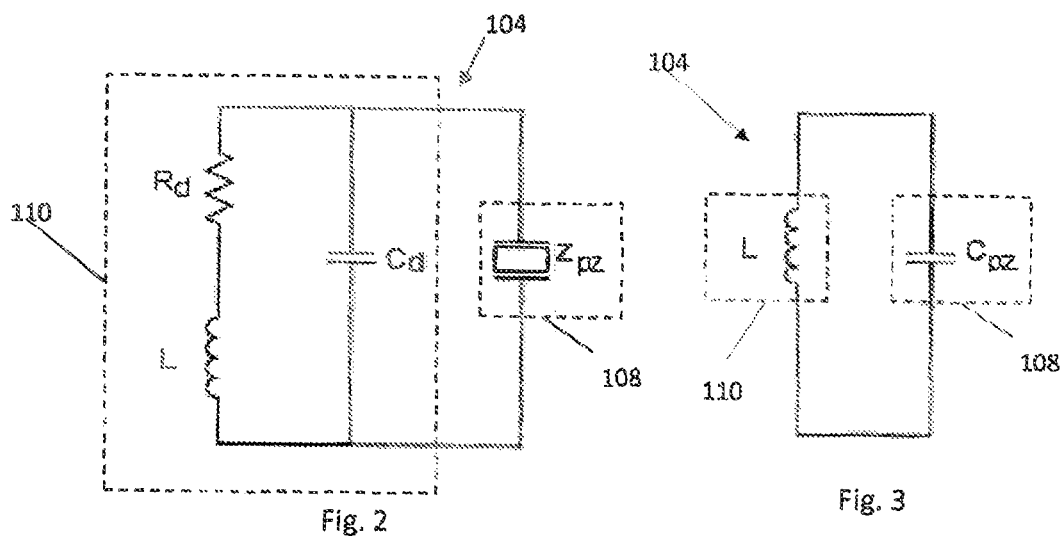
Fig. 2
Fig. 3

DOUBLE INDUCTANCE COILS FOR POWERING WIRELESS ULTRASOUND TRANSDUCERS

RELATED APPLICATIONS

The present application is a continuation of U.S. patent application Ser. No. 15/847,833, filed Dec. 19, 2017, which in turn is a continuation of International PCT Patent Application Serial No. PCT/GB16/51668, filed Jun. 7, 2016, which in turn claims priority to GB Patent Application Serial No. 1510968.9, filed on Jun. 22, 2015. The contents of the aforementioned applications are incorporated by reference herein.

TECHNICAL FIELD

The invention relates to a wireless sensor for non-destructive testing.

BACKGROUND TO THE INVENTION

Non-destructive testing (NDT) is used extensively across a range of industries to evaluate the properties of a test object without causing damage to the test object. Examples of test objects include composite aircraft panels, gas-turbine engine components, pipelines and pressure vessels.

It is known to integrate an NDT sensor into a test object in order to provide, for example, reliable repeatable measurement and/or in situ monitoring while the test object is in service. For example, it is known to integrate an ultrasound sensor in or on a test object.

Furthermore, it is known to provide wireless integrated NDT sensors that can be inductively coupled to a remote device. The inductive coupling enables power to be provided to the integrated sensor from the remote device in a similar manner to known radio-frequency identification (RFID) modules. The inductive coupling can also be used for the transfer of measurement information from the integrated sensor back to the remote device.

However, the present inventors have identified that the operable distance or range between the NDT sensor and the remote device required for inductive coupling is limited in known systems, particularly for sensors operated at high frequency such as ultrasound sensors.

SUMMARY OF INVENTION

According to a first aspect of the invention, there is provided a wireless ultrasound sensor for non-destructive testing of a test object, the wireless ultrasound sensor comprising:
 an ultrasound transducer;
 a first induction coil, electrically coupled to the ultrasound transducer; and
 a second induction coil, electrically coupled to the ultrasound transducer in parallel with the first induction coil;
 wherein the first and second induction coils are arranged to enable the ultrasound transducer to be inductively operated at an operating frequency thereof by a remote device; and
 wherein the outer diameter of the second induction coil is greater than the outer diameter of the first induction coil.

In a known wireless NDT sensor, an ultrasound transducer forms part of an inductor-capacitor (LC) circuit comprising the ultrasound transducer and an induction coil. For operation of the ultrasound transducer, the resonant frequency of the LC circuit should match an operating frequency of the ultrasound transducer. For NDT applications using an ultrasound transducer, this frequency is generally in the range of 1 to 10 MHz. In order to provide an LC circuit with a resonance in this frequency range for a given ultrasound transducer, the approximate required inductance of an induction coil can be estimated by:

$$L \approx \frac{1}{4\pi^2 f_0^2 C_{pz}}$$

where $f_o$ is the desired operating frequency of the transducer and $C_{pz}$ is the capacitance of the transducer. For example, for a 15 mm transducer with operating frequency of 5 MHz and a capacitance of 3.5 of an induction coil with an inductance of approximately 0.29 pH would be required.

Thus, it can be seen that an induction coil with a relatively low inductance is required for such applications. In order to provide a coil with relatively low inductance, it is known to design a coil with a relatively small number of turns and small diameter. For a planar coil, such as PCB flat coil, the coil inductance increases as the number of turns and diameter increases. As will be appreciated by a skilled person, the most important parameter in terms of the coil inductance is the number of turns, followed by the average coil diameter, which affects the outer diameter of the coil.

In order to achieve the inductance values required for high frequency operation of ultrasound transducers, the induction coil will typically have an average diameter of between 25 mm to 50 mm and a number of turns between 1 and 10.

However, using an induction coil with a small average diameter limits the maximum distance at which the wireless NDT sensor can be operated by an inductively coupled external device, since as the coil diameter is decreased, the operable inductive coupling distance is reduced. The maximum reading distance can be roughly equal to the outer diameter of the coil.

Including a second induction coil coupled in parallel with the transducer coil and the ultrasound transducer enables the remote operating range of the NDT sensor to be increased, whilst maintaining the resonant frequency of the LC circuit at a value required for operation of the ultrasound transducer. This effect is achieved by including a second induction coil with an outer diameter which is larger than that of the first induction coil.

In addition to improving the remote operation range of the wireless sensor, the use of two induction coils can also improve the strength of inductive coupling between the sensor and a remote device, as both of the induction coils contribute to the inductive coupling. Therefore the amplitude of a signal transmitted between the sensor and the remote device can also be increased in comparison to a single coil design.

The outer diameter of the second induction coil may be greater than the outer diameter of the first induction coil by a factor of at least 1.1 and preferably by a factor of at least 2.

The transducer, the first induction coil, and the second induction coil may be mounted in a coaxial arrangement. The first induction coil and the second induction coil can be mounted in substantially the same plane.

This gives rise to a sensor with a low profile, which can be easily mounted within a test object.

The first induction coil may have an inductance such that the first induction coil and the ultrasound transducer form a circuit with a resonant frequency that matches an operating frequency of the ultrasound transducer.

The first induction coil may have an inductance between 0.05 µH to 10 µH. Preferably, the first induction coil may have an inductance between 0.2 µH to 5 µH.

The second induction coil may have an inductance between 0.1 µH to 20 µH. Preferably, the second induction coil may have an inductance between 0.2 µH to 5 µH.

The sensor can include further outer induction coils electrically coupled to the ultrasound transducer in parallel with the first induction coil, each further induction coil having an outer diameter which is greater than the outer diameter of the first induction coil.

According to a second aspect of the invention there is provided a method of producing an ultrasound sensor for non-destructive testing of a test object, comprising:

providing a first induction coil having a first outer diameter;

providing a second induction coil having an outer diameter which is greater than the first outer diameter;

electrically coupling the first induction coil to the ultrasound transducer; and electrically coupling the second induction coil to the ultrasound transducer in parallel with the first induction coil.

The method can include the step of calculating the inductance value required to operate the ultrasound transducer at an operating frequency and the steps of providing the first and second induction coils can comprise:

providing a first induction coil having the required inductance value; and providing a second induction coil having a diameter which is greater than the first diameter and which provides an inductance that substantially does not change the total inductance of the ultrasound sensor.

This method ensures that the inductance of the ultrasound sensor is optimised for an operating frequency of the transducer by initially designing a first coil with an inductance that forms a resonant circuit of the required frequency, independently of the second coil. A second coil with a diameter greater than the diameter of the first coil is then added to the circuit in parallel with the first coil, in order to increase the remote operating range possible between the sensor and a remote device without significantly affecting the total inductance of the ultrasound sensor circuit. The present inventors have found that it is possible to increase the operating range by a factor of about 2 to 3 without adversely affecting the operation of the transducer.

According to a third aspect of the invention, there is provided a wireless sensor for non-destructive testing of a test object, the wireless sensor comprising:

a transducer;

a first planar induction coil, electrically coupled to the transducer; and a second planar induction coil, electrically coupled to the transducer in parallel with the first induction coil;

wherein the first and second induction coils are arranged to enable the transducer to be inductively operated at an operating frequency thereof by a remote device; and wherein the outer diameter of the second induction coil is greater than the outer diameter of the first induction coil.

This can lead to a low profile arrangement as well as enabling the remote operating range of the NDT sensor to be increased.

Optional features of the first aspect can be applied to the third aspect in an analogous fashion.

According to a fourth aspect of the invention there is provided a wireless non-destructive testing system comprising a wireless ultrasound sensor according to the first aspect and an inspection wand arranged to inductively operate the wireless ultrasound sensor.

BRIEF DESCRIPTION OF THE DRAWINGS

Embodiments of the invention will now be described, strictly by way of example only, with reference to the accompanying drawings, of which:

FIG. 1 is a schematic representation of a known wireless NDT system.

FIG. 2 is circuit diagram of the wireless ultrasound sensor of FIG. 1.

FIG. 3 is a simplified circuit diagram of the wireless ultrasound sensor of FIG. 1.

DESCRIPTION OF THE EMBODIMENTS

Figure 4:
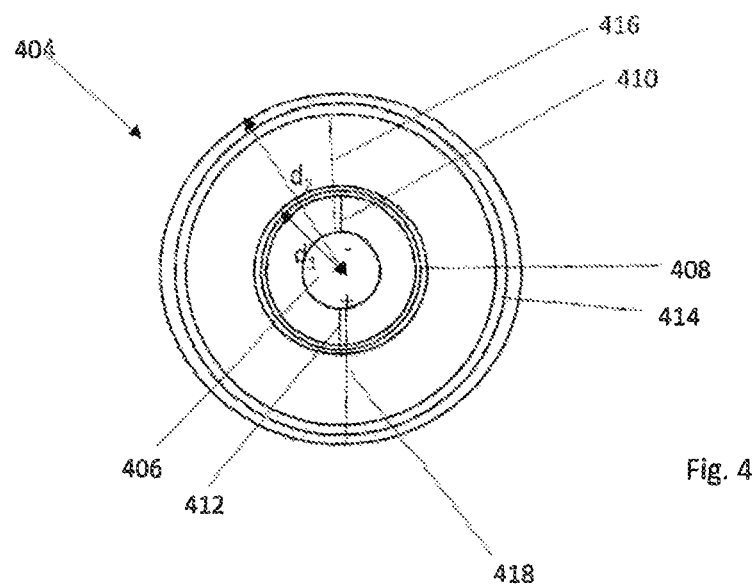
FIG. 4 is a schematic representation of a wireless ultrasound sensor.

Referring first to FIG. 1, a known wireless NDT system is shown generally at 100. The NDT system is arranged for testing of a test object 102 and comprises a wireless ultrasound sensor 104 which is embedded in or attached to the test object 102 and a remote device comprising an inspection wand 106. The wireless ultrasound sensor 104 comprises a piezoelectric ultrasound transducer 108, electrically coupled to an induction coil 110. The induction coil 110 enables the wireless ultrasound sensor 104 to be remotely powered by the inspection wand 106 by inductive coupling. The induction coil 110 is connected to a negative electrode of the transducer 108 by a first connection 112 and to a positive electrode of the transducer 108 by a second connection 114.

The induction coil 110 and the ultrasound transducer 108 together form an LC circuit with a particular resonant frequency. In use, the inspection wand 106 is brought towards the sensor 104 which induces a current in the LC circuit at the resonant frequency. This causes the transducer 108 to output an ultrasound pulse. The ultrasound pulse can reflect off a surface of the test object 102 and the reflected signal is received by the transducer 108, producing a current in the sensor 104 that can be transmitted to the inspection wand 106 via inductive coupling.

In order for inductive coupling to take place between the inspection wand 106 and the sensor 104, the inspection wand 106 must be held within a distance x of the ultrasound sensor 104. Outside of this range, the inductive coupling is too weak to enable the inspection wand 106 to operate (i.e. send and/or receive a signal to) the ultrasound sensor 104. The maximum operating distance is determined by a number of factors including the resonant frequency of sensor 104, the resonant frequency of the inspection wand 106, material between the inspection wand and sensor and the outer diameter d of the coil.

FIG. 2 shows a circuit diagram of the wireless NDT sensor 104 of FIG. 1. The induction coil 110 can be represented as an inductance L parasitic resistance $R_d$ and capacitance $C_d$, which are electrically coupled in parallel with the piezoelectric ultrasound transducer 108, which can be represented as an impedance $Z_{pz}$.

For high frequency (approximately 1 to 10 MHz) applications such as in an ultrasound sensor, a coil with a small number of turns (generally 1 to 10) is typically used and therefore the perfect inductor assumption may be made and the parasitic resistance and capacitance of the induction coil 110 can be neglected. Therefore, the electrical circuit can be simplified as shown in FIG. 3 to an inductance associated with the coil L, and a capacitance associated with the transducer $C_{pz}$. The frequency $f_o$ is then given by:

$$f_o = 1/(2\pi\sqrt{LC_{pz}})$$

and the required inductance of an induction coil can be estimated as:

$$L \approx \frac{1}{4\pi^2 f_0^2 C_{pz}}$$

It is known to design a coil to achieve this value of inductance by adjusting the parameters of the coil such as coil diameter, number of turns and turn density. An equation for inductance of a circular loop of number of turns N and circle radius R, with wire radius a, and medium relative permeability pr is given by:

$$L_{circle} \approx N^2 R \mu_0 \mu_r \left[ \ln\left(\frac{8R}{a}\right) - 2.0 \right]$$

In order to design a coil with the required inductance to achieve a frequency $f_o$ required to operate the ultrasound transducer, the coil will necessarily have a small diameter, particularly for a coil having a small number of turns, which in turn limits the distance at which the sensor 104 can be operated by the inspection wand 106, as the inductive coupling range is reduced for a smaller diameter coil.

In FIG. 4, a wireless ultrasound sensor according to a first embodiment is shown generally at 404. The sensor 404 comprises a piezoelectric ultrasound transducer 406 and a first planar induction coil 408. The first induction coil 406 is connected to a negative electrode of the transducer 406 with a first connection 410 and to a positive electrode of the transducer 406 with a second connection 412.

The wireless ultrasound sensor 404 further comprises a second planar induction coil 414, which has an outer diameter $d_2$ which is greater than the outer diameter $d_1$ of the first induction coil 408. The second induction coil 414 is connected to the negative electrode of the transducer 406 with a third connection 416 and to the positive electrode of the transducer 406 with a fourth connection 418. Thus the first and second induction coils 408, 414 are connected in parallel with the transducer 406. In some embodiments further outer induction coils can be provided in parallel with the first induction coil 408.

In the embodiment shown in FIG. 4, the first induction coil 408 has an outer diameter $d_1$ of between 35 mm and 75 mm and the second induction coil 414 has an outer diameter $d_2$ of between 38.5 mm and 150 mm. However, in some embodiments, the first induction coil can have an outer diameter $d_1$ of between 35 mm and 100 mm and the second induction coil can have an outer diameter $d_2$ of between 38.5 mm and 200 mm, with the outer diameter of the outer coil being at least 1.1 times that of the inner coil. The inner diameter of the outer coil can be at least 1.1 times the outer diameter of the inner coil, enabling a nested coil arrangement which can have a particularly low profile.

The first induction coil 408 can have between 1 and 20 turns. The second induction coil 414 can have between 1 and 20 turns.

The inner and outer coils 408, 414 can have any suitable wire radius. In some embodiments the wire radius can be the same for each coil 408, 414.

Figure 5:
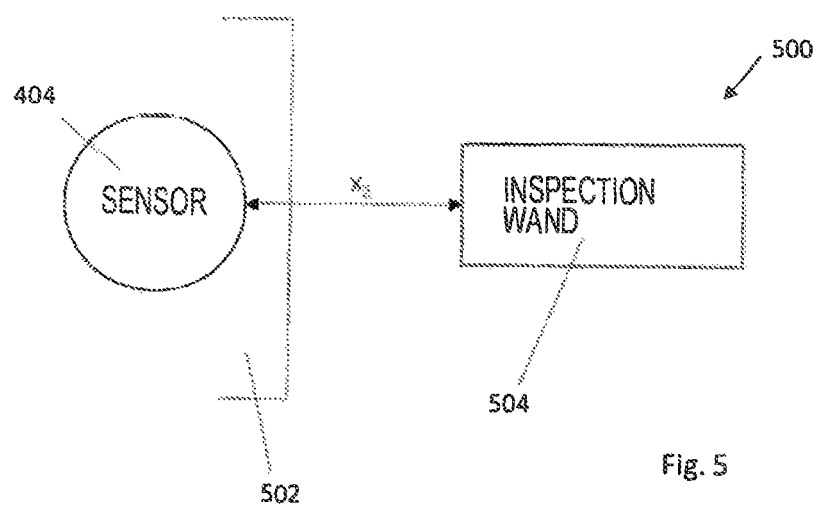
FIG. 5 is a schematic representation of a wireless NDT system including the sensor of FIG. 4.

FIG. 5 shows a wireless NDT system including the wireless ultrasound sensor 404 of FIG. 4 embedded in or attached to a test object 502 and a remote device, in this case an inspection wand 504. The wireless ultrasound sensor 404 can be inductively operated by the inspection wand 504 in a similar manner to the wireless NDT system of FIG. 1. However, because the wireless ultrasound sensor 404 includes first and second induction coils 408, 414, the NDT system 500 of FIG. 5 can be operated with a greater distance $x_2$ between the inspection wand 504 and the wireless ultrasound sensor 404 than would be possible for the NDT system of FIG. 1.

Figure 6:
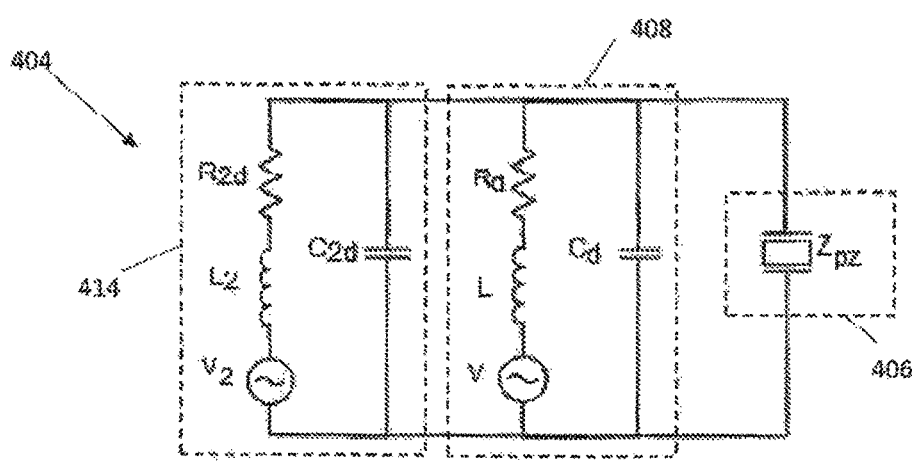
FIG. 6 is a circuit diagram of the wireless ultrasound sensor of FIG. 4.

FIG. 6 shows a circuit diagram of the wireless NDT sensor of FIG. 4. The first induction coil 408 can be represented as an inductance L, parasitic resistance $R_d$ and capacitance $C_d$. The second induction coil 414 can be represented as an inductance $L_2$, parasitic resistance $R_{2d}$ and capacitance $C_{2d}$. The first and second induction coils are coupled in parallel with the piezoelectric ultrasound transducer 108, which can be represented as an impedance $Z_{pz}$. In addition, the first and second induction coils also have associated voltages V and $V_2$ respectively, which are induced voltages caused by mutual inductance between the coils.

The sensor has a total inductance determined by the inductance values of the first and second induction coils (when the parasitic resistance and capacitance of the coils are negligible) which is given by:

$$L_{eq} = \frac{LL_2 - M^2}{L + L_2 - 2M}$$

Where $L_{eq}$ is the total inductance, L is the inductance of the first coil, $L_2$ is the inductance of the second coil and M is the mutual inductance between the coils. Thus, as the inductance of the second coil increases relative to the first coil, the total inductance $L_{eq}$ of the wireless ultrasound sensor 404 approaches the inductance of the first induction coil 408. This enables a second coil with a larger diameter to be included in the sensor, in order to increase the operable range of the sensor, whilst still enabling the total inductance of the sensor to be low enough to provide a resonant frequency circuit for high frequency applications. An improvement in range can be seen for any combination of induction coil average diameters, as long as the outer diameter of one is larger than the other and the resonant frequency of the LC circuit enables the transducer to be operated.

In some embodiments, the second induction coil 414 may have a non-negligible parasitic resistance and capacitance, as the energy loss due to parasitic resistance and capacitance increases as the diameter of the coil increases. In this case, the outer coil 414 can be designed to have a number of turns and diameter that are sufficient to provide an inductance $L_2$ which balances the parasitic capacitance, but does not lead to a significant parasitic resistance.

Figure 7:
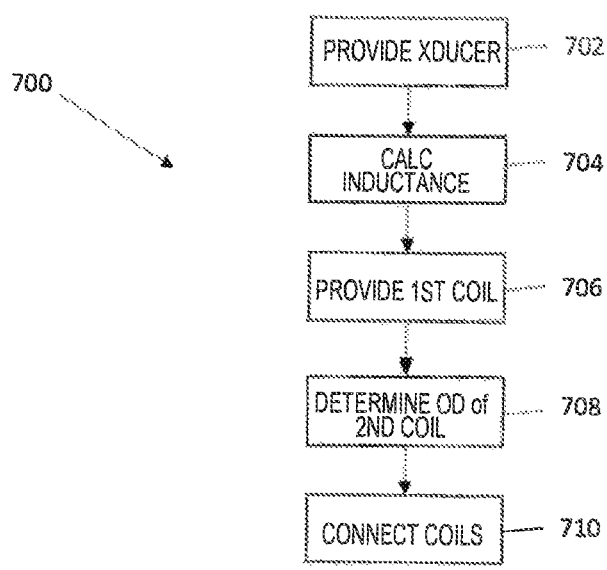
FIG. 7 is a schematic representation showing a first method of producing a wireless ultrasound sensor according to a second embodiment.

Referring now to FIG. 7, a method of producing an ultrasound wireless transducer is shown generally at 700.

At step 702, an ultrasound transducer, having a particular operating frequency and known static capacitance can be provided.

At step 704, the required inductance of a transducer coil necessary to form an LC circuit with a resonance at the operating frequency is calculated.

At step 706, a first induction coil, with a first diameter and having the calculated required inductance, is provided.

At step 708 the outer diameter of a second induction coil is determined. The inner diameter of the second induction coil can have a value which is larger than the outer diameter of the first induction coil. The outer diameter of the second induction coil is determined by the required reading distance and/or maximum sensor footprint for the given application. For example, the outer diameter can be approximately equal to twice the squared root of 2 multiplied by the optimum reading distance (2*Sqrt(2)*Reading distance), and approximately equal to the maximum reading distance.

At step 710 the first and second induction coils are each connected in parallel to the positive and negative electrodes of the ultrasound transducer.

As noted above, an improvement in sensor range can be seen for any combination of induction coil average diameters, as long as one is bigger than the other and the resonant frequency of the LC circuit enables the transducer to be operated. Thus, the method can comprise:

providing a first induction coil having a first average diameter;

providing a second induction coil having an average diameter which is greater than the first diameter;

electrically coupling the first induction coil to the ultrasound transducer; and electrically coupling the second induction coil to the ultrasound transducer in parallel with the first induction coil.

The invention claimed is:

1. A wireless ultrasound sensor for non-destructive testing of a test object, the sensor comprising:
an ultrasound transducer having a coupling face arranged to be acoustically coupled to the test object, the ultrasound transducer being arranged to output a pulse of ultrasound into the test object when ultrasound transducer is electrically energised, the ultrasound transducer being arranged to output an electrical signal when the ultrasound transducer is acoustically energised by an ultrasound echo signal from within the test object;
a first induction coil, electrically coupled to the ultrasound transducer; and
a second induction coil, electrically coupled to the ultrasound transducer in parallel with the first induction coil, the outer diameter of the second induction coil being greater than the outer diameter of the first induction coil, the first induction coil providing a first inductance, the second induction coil providing a second inductance and the first inductance being less than or equal to the second inductance, the first induction coil and the second induction coil being arranged to simultaneously electrically energise the transducer when the first induction coil and the second induction coil are inductively coupled to receive power from a remote device, wherein the transducer, the first induction coil and the second induction coil are mounted in a substantially coaxial and coplanar arrangement.

2. The wireless ultrasound sensor according to claim 1 wherein the outer diameter of the second induction coil is greater than the outer diameter of the first induction coil by a factor of at least 1.1.

3. The wireless ultrasound sensor according to claim 1 wherein the first induction coil has an inductance such that the first induction coil and the ultrasound transducer form a circuit with a resonant frequency that matches an operating frequency of the ultrasound transducer.

4. The wireless ultrasound sensor according to claim 1 wherein the first induction coil has an inductance between 0.05 µH to 10 µH.

5. The wireless ultrasound sensor according to claim 1 wherein the second induction coil has an inductance between 0.1 µH to 20 µH.

6. A method of producing an ultrasound sensor for non-destructive testing of a test object, comprising:
providing an ultrasound transducer;
providing a first induction coil having a first outer diameter;
providing a second induction coil having an outer diameter which is greater than the first outer diameter;
electrically coupling the first induction coil to the ultrasound transducer; and
electrically coupling the second induction coil to the ultrasound transducer in parallel with the first induction coil,
wherein the first induction coil provides a first inductance, the second induction coil provides a second inductance and the first inductance is less than or equal to the second inductance, and the first induction coil and the second induction coil are arranged to electrically energise the transducer when the first induction coil and the second induction coil are inductively coupled to receive power from a remote source, and the transducer, the first induction coil and the second induction coil are mounted in a substantially coaxial and coplanar arrangement.

7. The method of claim 6, including a step of calculating the inductance value required to operate the ultrasound transducer at an operating frequency and whereby the steps of providing the first and second induction coils comprise:
providing a first induction coil having the required inductance value; and providing a second induction coil having an outer diameter which is greater than the first diameter and which provides an inductance that substantially does not change the total inductance of the ultrasound sensor.

8. The wireless non-destructive testing system comprising a wireless ultrasound sensor according to claim 1 and an inspection wand arranged to inductively operate the wireless ultrasound sensor.

9. The wireless ultrasound sensor according to claim 1, wherein the inner diameter of the first induction coil is greater than the outer diameter of the transducer and the transducer is mounted within the first induction coil.

* * * * *